Nov. 6, 1923. 1,473,562
G. E. JONSSON
APPARATUS FOR PREVENTING THE BURSTING BY FREEZING OF WATER CIRCULATION
SYSTEMS FOR COMBUSTION ENGINES IN MOTOR CARS AND THE LIKE
Filed July 24, 1922 3 Sheets-Sheet 2
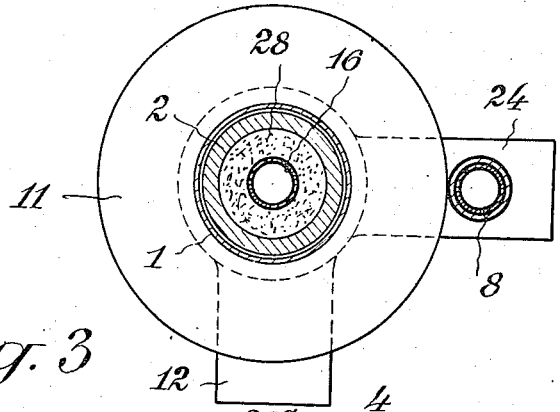
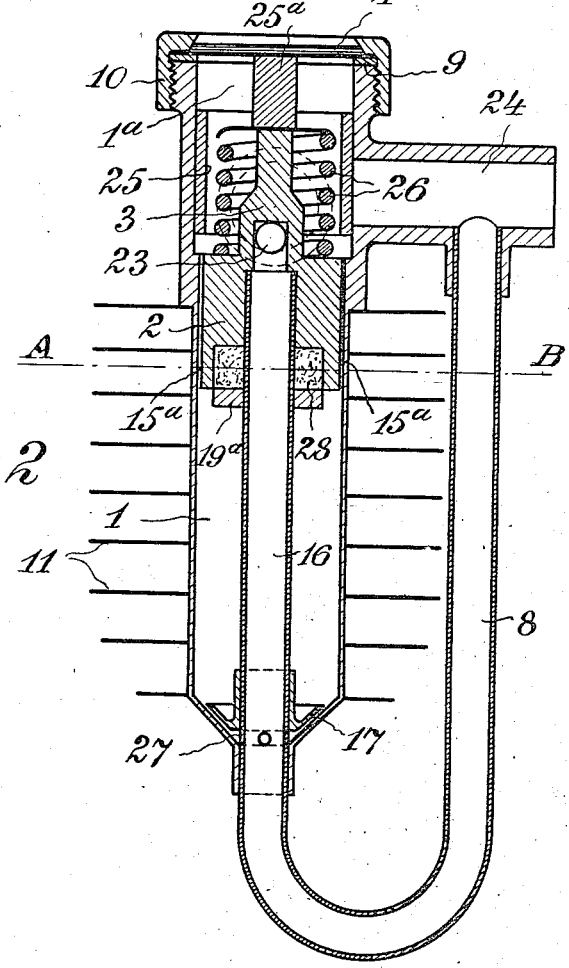

Patented Nov. 6, 1923.

1,473,562

UNITED STATES PATENT OFFICE.

GUSTAF EMIL JONSSON, OF HALMSTAD, SWEDEN.

APPARATUS FOR PREVENTING THE BURSTING BY FREEZING OF WATER-CIRCULATION SYSTEMS FOR COMBUSTION ENGINES IN MOTOR CARS AND THE LIKE.

Application filed July 24, 1922. Serial No. 577,171.

*To all whom it may concern:*

Be it known that I, GUSTAF EMIL JONSSON, a citizen of Sweden, and residing at Halmstad, in the Kingdom of Sweden, have invented a new and useful Apparatus for Preventing the Bursting by Freezing of Water-Circulation Systems for Combustion Engines in Motor Cars and the like, of which the following is a specification.

My present invention relates to an apparatus for preventing the bursting by freezing of the water circulation system used for cooling purposes in combination with combustion engines. The invention has particularly reference to preventing damages on the radiators and cooling jackets of combustion engines used on motor cars, but it may also be used for similar purposes in other combinations.

Figure 1:
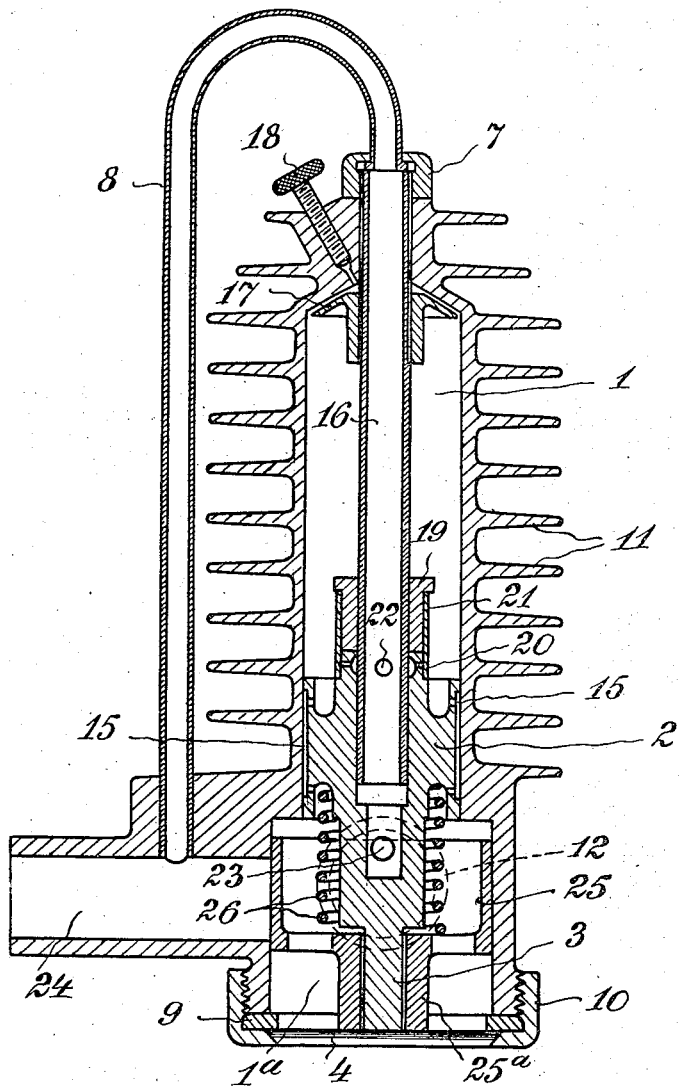

The invention is illustrated in the accompanying drawings. Fig. 1 shows one form of the apparatus seen in longitudinal section and Fig. 2 shows in the same manner another form thereof. Fig. 3 is a section along the line A—B in Fig. 2 and Fig. 4 in a similar manner as Figs. 1 and 2 shows a third form of the apparatus. In all of the figures the same particulars are referred to by the same reference letters.

Referring to Fig. 1 the apparatus consists of a cylinder 1 and a moveable plunger arranged therein, said plunger being provided with a spindle 3, the free end of which rests against a glass disc 4 closing the one end of the cylinder 1, so that a closed chamber 1ª is formed on the rear side of the plunger 2. Thus the cylinder 1 and closed chamber 1ª form what will be hereinafter termed in the claims as separate chambers, which in the described construction of the plunger, are communicating. The opposite or bottom end of the cylinder 1 is closed and has a conical interior surface, and said end is provided with a fitting 7 for connecting thereto one end of a pipe or hose 8, the other end of which communicates with the water circulation system so that the water from the same is introduced into the cylinder in the manner clearly described below.

The glass disc 4 closing the chamber 1ª bears upon a packing ring 9 arranged between the disc and the cylinder end, said disc and packing ring being kept in their proper place by means of a threaded muff 10.

The cylinder 1 may preferably be provided with radiating flanges 11 in order to increase its cooling surface and the chamber 1ª by means of a tubular connecting piece 12 (see also Fig. 3) is intended to be connected to the lowermost point of the cooling jackets of the engine, another similar connecting piece 24 being provided for connecting the apparatus with the lowermost point of the radiator. If necessary such connections or one of them may consist of intermediate pipes and the apparatus needs not to be directly connected either with the radiator or with the said cooling jackets but may be placed at any suitable and accessible place in the vicinity of the circulation system.

A pipe 16 forming a prolongation of the pipe or hose 8 extends centrally within the cylinder 1 and is rigidly fixed therein, and a collar 17 is fixed to the pipe 16 adjacent to the closed end of the cylinder 1 so that a small space is formed between the cylinder bottom and the surface of the collar facing the same. An air valve preferably consisting of a screw 18 is arranged in the cylinder bottom, so that air eventually enclosed in the cylinder may be permitted to escape therefrom by unscrewing the screw 18. When filling the apparatus the said screw may be left open until water escapes therethrough, whereafter it is closed.

Around the inner end of the pipe 16 is rigidly fixed an abutment, preferably in the form of a sleeve 19, and said abutment serves the purpose of limiting the inward travel of the plunger 2. The pipe 16 extends into the tubular inner portion of the plunger, which surrounds the open inner end of the pipe, and one or more radial holes 23 connect the interior of the pipe 16 and the tubular portion of the plunger with the chamber 1ª. The upper part of the said tubular portion communicates with the interior of the cylinder 1 by means of radial channels 20 when the flexible valve ring 21 is in open position. The valve ring 21 may preferably be made of india rubber and the like and the interior pressure within the pipe 16 opens the valve, but it cannot open by pressure within the cylinder 1. The valve ring is preferably fixed to the sleeve 19 so that it does not take part in the outward movement of the plunger.

The plunger is provided with a number of narrow channels 15 connecting the cylinder 1 with the chamber 1ª and at least a portion of each of these channels is provided in the outer surface of the plunger facing the cylinder wall.

A slideable valve member 25 is arranged within the chamber 1ª said valve member normally entirely closing the inlet opening of the pipe 24 but leaving the outlet opening of the pipe 12 open to a certain degree as will be understood from the drawing. The valve member 25 by means of a prolongation abuts against the glass disc 4 and said prolongation preferably consists of a sleeve 25ª surrounding the lower part of the spindle 3. A spring 26 is inserted between the outer surface of the plunger 2 and the valve member 25, said spring tending to push the valve member outwardly as soon as the glass disc 4 is broken.

The water enters the apparatus through the pipes 24, 8 and 16, passes the channels 22 and the valve ring 21 and enters the cylinder 1. Another part of the water flows through the channels 23 into the chamber 1ª and enters the cylinder 1 through the channels 15 after the chamber 1ª has been filled. The air eventually at hand within the cylinder 1 is permitted to escape through the air valve 18 and it is to be understood that the apparatus for a satisfactory working must be completely filled with water, since air bubbles in the cylinder cause a delay of the action desired. A moderate circulation through the apparatus constantly takes place by means of the passage comprising the members 24, 8, 16, 23, 1ª and 12. When the water tends to freeze the narrow channels 15 and especially the parts thereof nearest to the cylinder wall are first stopped up. Then the interior of the cylinder 1 is cut off from the chamber 1ª and when further freezing takes place the water within the cylinder is converted into ice. Then the plunger 2 is pressed outwardy and cracks the glass disc 4, the pieces of which are thrown out by means of the member 25ª pressed upon by the spring 26. Simultaneously the valve member 25 is also pressed outwardly and the pipes 24 and 12 are totally opened, whereafter the circulation system is drained in a way easily to be understood without further explanations. Since the valve ring 21 does not take part in the outward travel of the plunger 2 the lower end of the ring slips off from the channels 20 and the water eventually at hand in the cylinder may escape through the passages 20, 22, 23 and 1ª. Therefore the apparatus cannot be damaged by the ice formed within the cylinder 1.

It is to be understood that for the intended action of the apparatus the interior of the cylinder 1 needs not be completely filled with ice, but a thin layer nearest to its walls is quite sufficient for the purpose. Considering the cylinder to be completely filled with water this thin layer (the water being practically not compressible) is sufficient to increase the interior pressure in such a degree that the plunger is forced outwardly and a rather minute travel of the plunger is sufficient, since the glass disc will be broken thereby and thereafter the spring 26 fulfills the action. If air bubbles are at hand within the cylinder the action described is delayed in a degree corresponding to the increased ice formation, which is necessary in order to compress the air sufficiently for giving it a pressure equal to the pressure of the water.

The modified apparatus shown in Fig. 2 differs from the one just described in that it has the lower inlet to the cylinder 1 and holes 27 arranged below the collar 17 and between the same and the closed end of the cylinder. The space between said collar and the cylinder bottom is so small that the water therein is subjected to freezing earlier than the water within the cylinder and previous to or simultaneously with the water within the narrow passages of the plunger, clearly described below. Any air valve is hardly necessary in this modification, since the air may escape through the holes 27 when filling the apparatus. The plunger may be of a somewhat smaller diameter than the cylinder bore so that narrow communicating passages may be formed between it and the wall of the cylinder, but since it is essential that said passages have the same area or depth around the whole circumference the plunger from the beginning may be given a close fitting in the cylinder whereafter it may be provided with longitudinal grooves 15ª evenly distributed around its circumference. The ridges formed between said grooves serve the purpose of guiding the plunger.

In this modification the valve arrangement 20, 21 is dispensed with and the fixed pipe 16 is provided with a flange 19ª and surrounded by a flexible packing 28 arranged between said flange and the inner end of the plunger. The spindle 3 of the plunger does not rest directly against the glass disc 4 but against the inner end of the prolongation 25ª. The outer end of said prolongation rests against the glass disc 4.

The water enters the apparatus through the pipes 24 and 8 and the cylinder is filled with water coming partly through the holes 27 and partly through the passages 16, 23, 1ª and 15ª. A part of the water escapes through the pipe 12 as described above and a circulation is established through the apparatus. When the water tends to freeze the space between the collar 17 and the cylinder bottom is first filled with ice and simultaneously therewith or immediately thereafter the passages 15ª are stopped up in the same manner, whereafter the apparatus acts precisely as described above.

Figure 4:
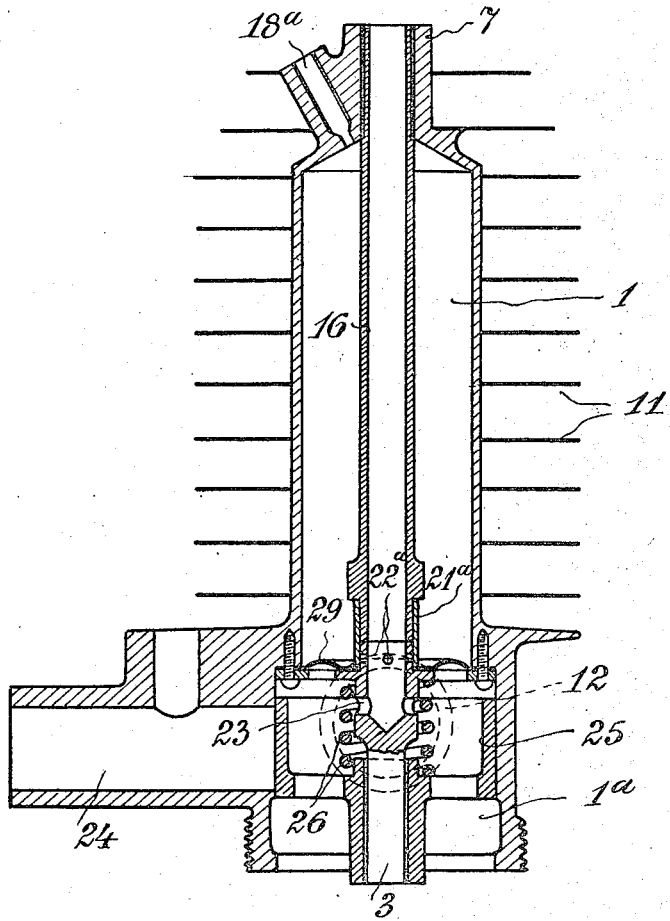

The modification shown in Fig. 4 is substantially like the one shown in Fig. 1, but the plunger is substituted by a membrane 29, the central part of which is tightly connected with the spindle 3, the edges of the same being tightly affixed to the cylinder wall. The water enters the apparatus by means of the pipes 24 and 16, passes the holes 22ª and the lower edge of the flexible valve sleeve 21ª and fills the cylinder 1, whereby the air within the same may be permitted to escape through the air valve bore 18ª. After the cylinder 1 has been filled there occurs no circulation through the same but a flow of water passes continuously through the passage 16, 23, 1ª and 12. When freezing the ice formation within the cylinder 1 causes a pressure upon the water therein and the membrane together with the spindle 3 is pressed outwardly breaking the glass disc (not shown in Fig. 4). Thereafter the spring 23 by means of the valve member 25 throws the glass splinters out and the said valve member opens so that the circulation system is drained, as described above. The water within the cylinder may also escape, since the valve sleeve 21ª does not take part in the outward movement of the spindle 3, therefore the holes 22ª become uncovered.

It is to be understood that the apparatus may be further modified and combinations of the modifications described may be used in practice without departing from the spirit of the invention. Also in the modification shown in Fig. 2 an air outlet valve from the cylinder may be used and in the last mentioned modification a flexible valve sleeve similarly to the sleeve 21 and 21ª may be used instead of the inlets 27.

Having now particularly described and ascertained my invention, I declare that what I claim is:—

1. An apparatus for preventing the bursting by freezing of water circulation systems for combustion engines comprising a container and means moveable therein, means for connecting said container with the circulation system to be protected, so that it will be filled therefrom, a fragile means such as a glass disc closing one end of the container and means interposed between the moveable means within the container and the fragile closing means of the same intended for breaking the said closing means when the moveable means is acted upon and moved in one direction by the pressure arising within the container on one side of the movable means upon the formation of ice within the same.

2. An apparatus as specified in claim 1, comprising the feature that the moveable means within the container divides the same in two chambers, both of which are filled with water.

3. An apparatus as specified in claim 2, comprising the feature that the chamber of the container closed by the fragile means is by tubular conductors adapted to be connected with the lowermost point of the circulation system to be protected.

4. An apparatus as specified in claim 3, comprising the feature that the end of the container opposite to the one closed by the fragile means is closed so as to form a rigid bottom but connected with the circulation system.

5. An apparatus as specified in claim 4, comprising the additional feature that a valve member is provided within the container compartment closed by the fragile means and by the latter kept in such a position that one conduit forming the inlet of the water flow into said compartment is entirely closed but another conduit forming the outlet therefrom is at least partially kept open.

6. An apparatus as specified in claim 5, comprising the additional feature that a spring is interposed between the moveable means within the container and the valve member, said spring tending to press the said members apart.

7. An apparatus as specified in claim 4, comprising the feature that a pipe connected with the circulation system extends into the compartment of the container opposite to the one closed by the fragile means, said pipe being open at its inner end and surrounded by a tubular portion of the moveable means, the said tubular portion being in communication with the container compartment closed by the fragile means.

8. An apparatus as specified in claim 7, comprising the additional feature that the pipe connected with the circulation system and extending into the compartment of the container opposite to the one closed by the fragile means communicates by means of narrow passages with the first mentioned container compartment.

9. An apparatus as specified in claim 4, comprising the additional feature that the container compartment opposite to the one closed by the fragile means is provided with a controllable air outlet.

10. An apparatus as specified in claim 4, comprising the additional feature that the moveable member dividing the container into two compartments is provided with narrow channels connecting said compartments, at least a part of each of said channels being placed in the vicinity of the container wall.

11. An apparatus as specified in claim 2, comprising the feature that the moveable means within the container consists of a plunger, the outward movement of which is transferred to the fragile closing means for breaking the same.

In testimony whereof, I have signed my name to this specification in the presence of two subscribing witnesses.

GUSTAF EMIL JONSSON.

Witnesses:
HJ. BRANZELL,
G. PETERSSON.